UNITED STATES PATENT OFFICE.

JOHN WILLIAM SLATER, OF HOLLOWAY, COUNTY OF MIDDLESEX, AND WILLIAM STEVENS, OF LONDON, ENGLAND.

TREATING SEWAGE.

SPECIFICATION forming part of Letters Patent No. 352,894, dated November 16, 1886.

Application filed March 31, 1885. Serial No. 160,808. (No specimens.) Patented in England December 1, 1884, No. 15,810, and December 17, 1884, No. 16,592.

*To all whom it may concern:*

Be it known that we, JOHN WILLIAM SLATER, of Holloway, in the county of Middlesex, England, and WILLIAM STEVENS, of the city of London, England, subjects of the Queen of Great Britain, have invented improvements in the preparation of an agent for use in the treatment of sewage and other liquid or semi-liquid putrescent or putrescible matters and improvements in the treatment of such matters, (for which we have made applications for Letters Patent in Great Britain, No. 15,810, dated December 1, 1884, and No. 16,592, dated December 17, 1884,) of which the following is a specification.

In the processes hereinafter set forth for the purification of sewage and other liquid putrescent or putrescible matter, we take the mineral known as "gibbsite," or any other naturally-occurring terhydrate of alumina, or we take clay or other aluminous mineral containing a considerable quantity of terhydrate of alumina, and add to it muriatic acid, and heat the mixture until the terhydrate of alumina present has combined with the acid. The acid used may be the crude muriatic acid produced in alkali manufacture on the Leblanc process, and known in commerce as "tower salts." Where this acid is readily obtainable we prefer to use it on account of its cheapness. If the gibbsite or the clay or other mineral selected for use contain much water, we dry it in order to facilitate its reduction to powder, and to avoid dilution of the acid by the water contained in the said matter. The quantity of acid necessary to be added to a given quantity of the gibbsite or other aluminous mineral to be treated depends on the strength of the acid and the proportion of alumina present in the mineral. When these are ascertained, the acid should be added to the mineral in such quantity that there shall be three equivalents of actual muriatic acid to two equivalents of the terhydrate of alumina. The temperature to which the mixture should be heated is about that of boiling water. In order to ascertain when the whole of the terhydrate of alumina has combined with the acid, small quantities of the undissolved mineral in the mixture must be tested from time to time by analysis or otherwise. When the period necessary for the treatment of any given sample of gibbsite or other mineral has been thus ascertained, it may be noted, and in treating further quantities of the same mineral the heating of the mixture may be continued for a like period, further analysis of the said mineral while under treatment being then unnecessary. It is important that only those minerals be used which contain terhydrate of alumina. The monohydrate of alumina (known as "diaspore") and the bihydrate of alumina (known as "bauxite" and "beauxite") are unsuitable, being only very slightly soluble in muriatic acid. By the term "terhydrate of alumina" we refer to naturally-occurring combinations of alumina consisting of three or more molecules of water, in combination with one molecule of the oxide of aluminium. In selecting clay or other aluminous minerals of the kind hereinbefore referred to we reject those containing an appreciable amount of carbonate of lime, and in some cases we also reject those containing about five per cent. and upward of any compound of iron, for the following reasons: The acid used combines with carbonate of lime more readily than with alumina. Consequently when carbonate of lime is present a greater quantity of acid is required for producing the required action on the aluminous mineral than is required when carbonate of lime is not present. The presence of iron in the aluminous mineral causes a yellow tint in water treated (as hereinafter described) with muriate of alumina prepared from a mineral containing iron, which yellow tint is in some cases objectionable. As, however, this is the only effect produced by the presence of iron minerals in which it occurs in association with the required constituents may be used in preparing the muriate of alumina if the appearance of the water after treatment with it be of slight importance.

Muriate of alumina prepared as hereinbefore described is cheaper than that produced in the ordinary way.

Our invention is also applicable to treating sewage and other like matter, such as the waste liquors from dye-works and tanneries, and other waste liquors, and such other liquid or semi-liquid putrescent or putrescible matters as are capable of purification by precipitation. In the following description sewage only is referred to. The process is, however, similar in the case of other matters, except as regards the quantities or proportions of the agents used, which vary according to the quantity and nature of the putrescent or putrescible constituents of the said matters. We add to the sewage to be treated a quantity of clay and carbon or charcoal ground together with water and a quantity of the muriate of alumina prepared as hereinbefore described, and thus produce precipitation of the putrescent or putrescible constituents of the sewage. We prefer to add the mixture of clay and carbon first, and after they have become thoroughly incorporated with the sewage we add the muriate of alumina. The clay and carbon and muriate of alumina may, however, be mixed together before being added to the sewage where from any reason it is more convenient to do so than to add them separately. The muriate of alumina being acid, it is necessary to neutralize the sewage if it be acid. This may be done by adding lime to the sewage, either before or after adding the mixtures thereto.

In preparing the mixtures hereinbefore described any kind of carbon or charcoal may be used, such as the refuse charcoal or carbon resulting from certain manufactures or carbonized peat-moss. Lignite (otherwise known as "bovey coal," and "moor-coal," and "wood-coal") is also suitable for use as carbon in preparing the said mixtures.

The proportions in which we use the mixtures hereinbefore described depend on the nature and quality and condition of the sewage or other matter to be treated. In the case of sewage of average quality (i. e., sewage containing per gallon about one hundred and twenty grains of sewage matter in suspension or solution) we add to every ten thousand gallons thereof as much of the muriate of alumina as is obtained by treating from eight to twelve pounds weight of gibbsite, as hereinbefore described, and from forty to eighty pounds weight of carbon or charcoal, and from forty to eighty pounds weight of clay containing the average amount of moisture, (about forty per cent.) We do not, however, limit ourselves to these proportions.

In some cases we use blood in conjunction with the matters hereinbefore described. When the clay and carbon are to be added to the sewage separately from the muriate of alumina, we prefer to add the blood to the mixture of clay and carbon. When the clay and carbon are mixed with the muriate of alumina before being added to the sewage, we add the blood to the said mixture.

The proportion of blood which we use is about one-quarter of a pound, by weight, to ten thousand gallons of sewage of average quality; but we do not limit ourselves to the use of any definite proportion of blood, the proportion required being mainly dependent on the nature and quality of the sewage to be treated.

The blood should be fresh or not coagulated. It may be preserved in a state fit for use by being mixed with about its own weight of dry earth or clay as it is drawn from the animal slaughtered.

The sewage may be conveniently treated in a tank or other receptacle, in which it may be allowed to remain until the impurities have been precipitated, when the supernatant water may be allowed to run off and the precipitate removed and disposed of in any convenient way; or the sewage may be treated as it flows to or through a series of tanks in which the impurities are precipitated, and from which the supernatant water passes continuously.

The use of muriate of alumina in the purification of sewage and other like matters is preferable to the use of sulphate of alumina, the result being superior. One objection to the use of sulphuric acid in any combination is, that the growth of "sewage fungus" (*Beggiatoa alba*) is favored thereby, and this objection does not attend the use of combinations of muriatic acid.

Having thus described our invention, we wish it to be understood that we do not limit ourselves to the precise details hereinbefore described, as they may be varied without departing from the nature of our invention; but

We claim—

1. In the purification of liquid sewage and similar matters, the process described, consisting in mingling terhydrate of alumina which is free from carbonate of lime with muriatic acid, subjecting the mixture to heat until the acid has combined with the terhydrate, and adding the muriate of alumina resulting to the liquid sewage, substantially as described.

2. In the purification of liquid sewage and similar matters, the process set forth, consisting in mingling terhydrate of alumina which is free, or nearly so, from carbonate of lime with muriatic acid, subjecting the mixture to heat until the acid has combined with the alumina, adding the resulting muriate of alumina to the sewage in the presence of clay and carbon ground together with water, substantially in the proportions specified.

JOHN WILLIAM SLATER. [L. S.]
WILLIAM STEVENS. [L. S.]

Witnesses:
PERCY LEOPOLD WILLIAM H. REY,
JOHN ALFRED DONNISON.